United States Patent [19]

Niidoi

[11] Patent Number: 5,531,144
[45] Date of Patent: Jul. 2, 1996

[54] NC LOADER FOR NC MACHINE TOOL

[75] Inventor: Hideo Niidoi, Anjo, Japan

[73] Assignee: Tecno Wasino Co., Ltd., Aichi, Japan

[21] Appl. No.: 360,023

[22] Filed: Dec. 20, 1994

[30] Foreign Application Priority Data

Dec. 24, 1993 [JP] Japan .................................. 5-325527

[51] Int. Cl.⁶ .............................. B23B 15/00; B23Q 7/04
[52] U.S. Cl. ............................................. 82/127; 414/226
[58] Field of Search ............................... 82/127; 414/225, 414/226, 751; 198/346.2, 468.2

[56] References Cited

U.S. PATENT DOCUMENTS

| 4,317,394 | 3/1982 | Link et al. | 82/124 |
| 4,958,543 | 9/1990 | Newton et al. | 82/124 |

FOREIGN PATENT DOCUMENTS

| 1261767 | 10/1986 | U.S.S.R. | 414/226 |
| 1569175 | 6/1990 | U.S.S.R. | 414/226 |

*Primary Examiner*—M. Rachuba
*Assistant Examiner*—Kenneth J. Hansen
*Attorney, Agent, or Firm*—Wigman, Cohen, Leitner & Myers

[57] ABSTRACT

In an NC loader (1) for a machine tool-having a main spindle (7) mounted on a main spindle base (5), the NC loader comprises: a support frame (41) mounted on the main spindle base; a loader body (45) mounted on the support frame and having a horizontal shaft (43) movable in a horizontal direction, and a vertical shaft (47) movable in a vertical direction; a load/unload hand (53) provided with both work and product hand sections (49, 51) integrally attached to an end of the vertical shaft; at least one work shooter (55) attached to the support frame, for loading work onto the work hand section of the load/unload hand; and at least one product shooter (57) attached to the same support frame, for unloading products from the product hand section of the load/unload hand. Since the work loading position and the product unloading position are both set to near the same lower end position of the vertical shaft (47), it is possible to reduce the number of shafts and thereby to reduce the setup time and setup labor required for the NC loader 39. Further, since the work shooter and the product shooter are both of exchangeable cassette type, it is possible to further reduce the exchange time and exchange labor of both the work and product shooters according to the sizes thereof.

5 Claims, 4 Drawing Sheets

1

NC LOADER FOR NC MACHINE TOOL

BACKGROUND OF THE INVENTION

1. Field of the Invention

The present invention relates to an NC loader for a machine tool, which is particularly suitable for use with an NC lathe, and more specifically to an NC loader for loading small workpieces to be processed onto the NC lathe and unloading small products already processed from the NC lathe automatically in accordance with numerical control.

2. Description of Related Art

Conventionally, an NC loader for loading small workpieces to be processed and unloading products already processed is mounted on an NC lathe in the case where a great quantity of small raw materials are processed (e.g., cut), in particular. In the conventional NC loader, a workpiece loader body movable in the horizontal direction to load a workpiece is disposed over a main spindle, and a hand up-and-down moving cylinder for moving a workpiece loading hand in the vertical direction is mounted on the workpiece loader body. Further, a piston rod for moving the workpiece loading hand up and down is mounted on the hand up-and-down cylinder, and a workpiece loading hand is attached to the lower end of this piston rod. In addition, a workpiece shooter is arranged near an uppermost movement position of the workpiece loading hand. Further, various movement end adjusting stopper members (frontward and reward and upward and downward) are provided for limiting the horizontal movement of the loader body and the vertical movement of the workpiece loading hand, respectively.

On the other hand, a front-and-rear moving cylinder for unloading products is disposed obliquely above the main spindle. Further, a piston rod is mounted on the front-and-rear cylinder, and a product unloading hand is attached to the end of this piston rod. In addition, a product shooter is arranged near an uppermost movement position of the product unloading hand. Further, two movement end adjusting stopper members (forward and reward) are provided for limiting the horizontal movement of the product unloading hand.

In the construction as described above, first the front-and-rear cylinder is actuated to move the product unloading hand to near a chuck attached to the main spindle and then the chuck is opened to release a product into the product unloading hand. After that, immediately after the product unloading hand is moved to the rearward movement position, a lid of the product unloading hand is opened to allow the product to flow along the product shooter.

After the product unloading hand is moved rearward, the front-and-rear cylinder is actuated to move the workpiece loader body to the frontward movement position thereof, and then the hand up-and-down cylinder is actuated to move the workpiece loading hand downward. When the workpiece loading hand has been moved downward, the workpiece loader body is moved backward, so that workpiece is loaded on the chuck. After that, the chuck is fastened to grip the workpiece. Thereafter, the workpiece loader body is moved frontward, and the workpiece loading hand is moved upward. The workpiece loader body is moved rearward again, so that a workpiece is supplied from the workpiece shooter to the workpiece loading hand, and then clamped by the workpiece loading hand. The above-mentioned operation is repeated to load work and unload products.

In the conventional NC loader as described above, however, whenever a workpiece must be replaced with another workpiece for each production schedule, various adjustments are so far required; that is, the frontward and reward and upward and downward stoppers must be readjusted, respectively; the widths of the workpiece shooter and the product shooter must be readjusted, respectively; shooter rails must be replaced with other ones, thus causing problems in that a lot of time and skills are needed for setting-up of the NC loader for the NC lathe, with the result that the NC loader is not suitable for production lines for various models of small quantity.

Further, a sequencer for controlling the NC loader is provided separately for the lathe, it has been necessary to learn the operation of the sequencer and program in order to change the operation sequence.

SUMMARY OF THE INVENTION

With these problems in mind, therefore, it is an object of the present invention to provide an NC loader of a machine tool, by which the workpiece loading position from the workpiece shooter and product unloading position to the product shooter are arranged near the same single shaft to reduce the number of shafts and further to decrease the number of setup positions, while facilitating the exchange or replacement of the workpiece and product shooters according to the sizes of the workpiece and products.

To achieve the above-mentioned object, the present invention provides an NC loader for a machine tool having a main spindle mounted on a main spindle base, which comprises: a support frame mounted on the main spindle base; a loader body mounted on said support frame and provided with a horizontal shaft and a vertical shaft to allow said loading body to be movable in both horizontal and vertical directions, respectively; a load/unload hand provided With a workpiece hand section and a product hand section both integrally attached to an end of the vertical shaft; at least one workpiece shooter attached to said support frame, for loading workpieces onto the workpiece hand section of said load/unload hand; and at least one product shooter attached to said same support frame, for unloading products from the product hand section of said load/unload hand.

In the loader body, the horizontal shaft is mounted on said support frame so as to extend in the horizontal direction; the loader body is slidably mounted on the horizontal shaft; and the vertical shaft is disposed in said loader body so as to be movable in the vertical direction.

The workpiece hand section of said load/unload hand comprises: a hand body attached to a lower end of the vertical shaft; a lower clamp jaw fixed to said hand body, for receiving workpieces discharged from said workpiece shooter; a pivotal upper clamp jaw pivotally attached to said hand body, for clamping the discharged workpiece in cooperation with said lower clamp jaw; and a piston rod for pivoting said upper clamp jaw after the discharged workpiece has been mounted on said lower clamp jaw.

The NC loader further comprises a work sensor having: a horizontal axle disposed between said lower clamp jaw and said upper clamp jaw; a stopper member attached to an end of said horizontal axle; a spring for urging said horizontal axle; a dog attached to the other end of said horizontal axle; and a proximity switch for sensing a movement of said dog attached to said horizontal axle, when the workpiece hand section receives the discharged workpiece so that said stopper member moves said horizontal axle against an elastic force of said spring, to actuate said upper clamp jaw for clamping the discharged workpiece in cooperation with the lower clamp jaw.

Further, the product hand section of said load/unload hand comprises: a bucket mounted at a lower end of said load/unload hand; and a pivotal bar disposed within said bucket for receiving a product.

Further, the product hand section of said load/unload hand further comprises pivotal means for pivoting said pivotal bar, including: a cutout formed in a bottom portion of said bucket; and a pivotal pin engageable with the cutout formed in said bucket to discharge a product within said bucket to said product shooter, when said pivotal pin is engaged with the cutout.

Further, the workpiece and product shooters are of cassette type exchanged according to sizes of the workpiece and products.

In the NC loader for the machine tool according to the present invention, since the single load/unload hand provided with both workpiece and product hand sections is attached to the end of the vertical shaft, it is possible to reduce the number of shafts and the number of setup positions.

Further, since the workpiece shooter and product shooter are formed into cassette type, these shooters can be replaced with other ones easily according to the sizes of the workpiece and product.

DETAILED DESCRIPTION OF THE EMBODIMENTS

An embodiment of the NC loader for an NC machine tool according to the present invention will be described hereinbelow with reference to the attached drawings.

Figure 1:
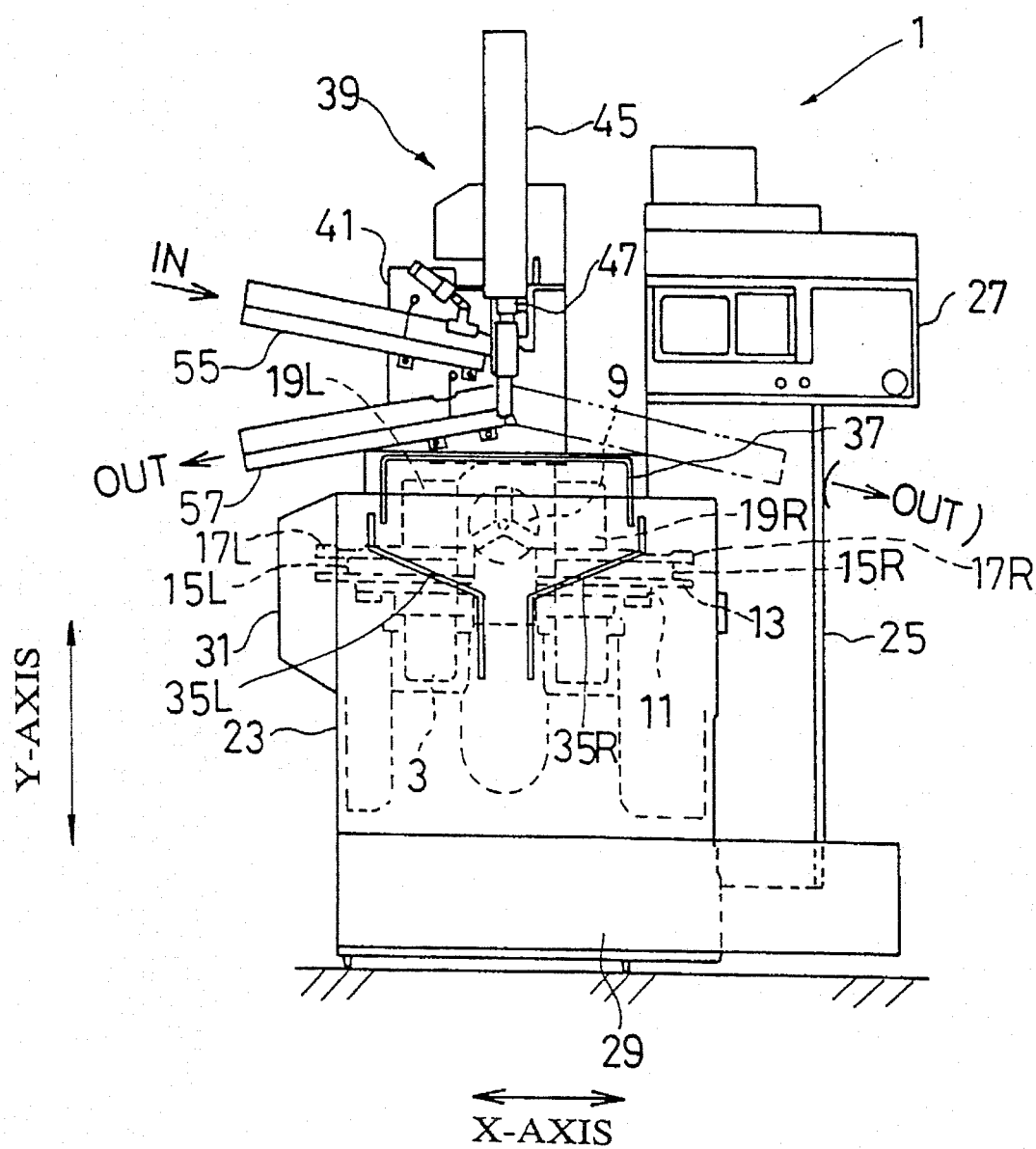
FIG. 1 is a front view showing a small-sized NC lathe, to which an embodiment of the NC loader according to the present invention is applied, by way of example.
Figure 2:
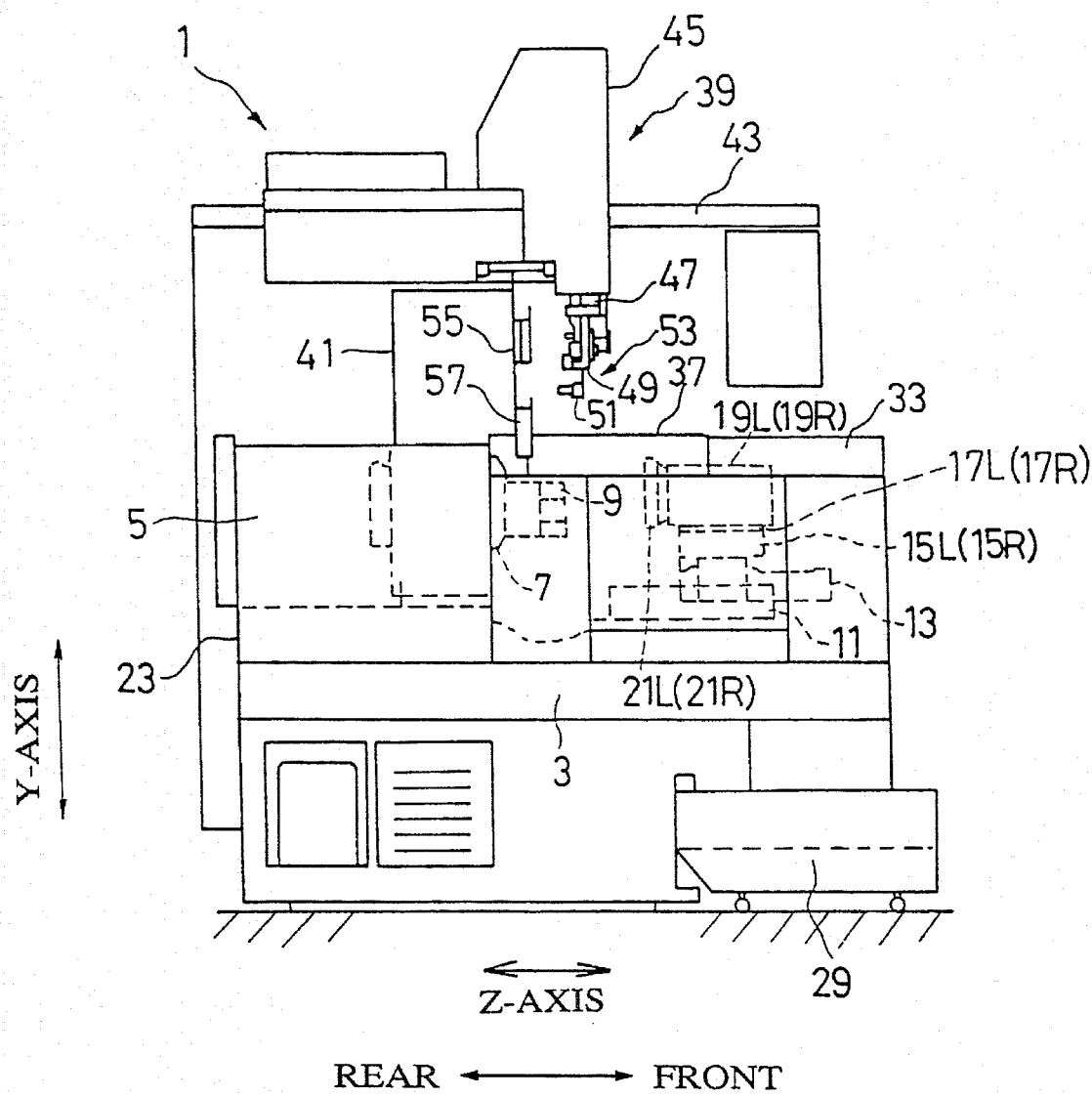
FIG. 2 is a side view showing the same small-sized NC lathe.

In FIGS. 1 and 2, a small-shaped NC lathe 1 has a box-shaped base 3, and a spindle base 5 is disposed on the left side of the base 3 in FIG. 2. A main spindle 7 rotated by a main spindle driving mechanism (not shown because well known) is mounted on the main spindle base 5. Further, a chuck 9 is attached to an end of the main spindle 7 to clamp workpiece to be cut off by the lathe.

In FIG. 2, on the right side of the base 3, a Z-axis saddle 11 is disposed. Further, on the Z-axis saddle 11, a Z-axis slide 13 is mounted so as to be moved by a driving mechanism along the Z-axis direction. On the Z-axis slide 13, two X-axis saddles 15R and 15L are mounted. On these two X-axis saddles 15R and 15L, X-axis slides 17R and 17L are further mounted so as to be moved by driving mechanisms in the X-axis direction.

On the two X-axis slides 17R and 17L, two tool bases 19R and 19L are mounted, respectively. Further, on these two tool bases 19R and 19L, two turrets 21R and 21L each provided with a plurality of tools are mounted, respectively.

In the above-mentioned construction, after workpiece has been clamped by a chuck 9 and further the main spindle 7 has been rotated, when the Z-axis slide 13 is moved in the Z-axis direction and the X-axis slides 17R and/or 17L are moved in the X-axis direction to adjustably move the chucked tool both in the Z- and X-axis directions, it is possible to cut the chucked workpiece into any desired shape by the tool.

In FIG. 1, a base frame 23 is disposed so as to surround the base 3, and a control board 25 is disposed on the right side of the base frame 23. Further, on the control board 25, a console panel 27 is provided. Further, in FIG. 2, on the lower right side of the base 3, a movable chip box 29 is provided for accommodating chips produced when workpiece is cut off by the NC lathe 1. On the left side surface of the base frame 23 in FIG. 1, a cover 31 is mounted; and on the upper right surface of the frame 23 in FIG. 2, a door cover 33 is mounted.

As shown in FIG. 1, to the Z-axis slide 13, right and left slide guards 35L and 35R both being sloped inward are fixed a distance apart away from each other.

Accordingly, whenever the Z-axis slide 13 is moved in the Z-axis direction, these two slide guards 35L and 35R can be also moved in the same Z-axis direction together. Further, since both the slide guards 35R and 35L are sloped inward with respect to each other, chips produced during cutting can drop easily along the sloped surfaces of the slide guards 35L and 35R. Further, owing to the inclined slide guards 35R and 35L, it is possible to prevent long chips from adhering onto the slide units composed of the Z-axis saddles 15R and 15L and the X-axis saddles 17R and 17L.

In FIG. 2, two fixed rails 33 (not shown) are fixedly arranged between a guard head (not shown) mounted on the front side (right side in FIG. 2) of the main spindle 7 and a main guard (not shown) mounted on the front end (right side in FIG. 2) of the base frame 23. On these fixed rails, a movable guard 37 is disposed so as to be movable in the Z-axis direction on these fixed rails. Accordingly, the movable guard 37 can be moved smoothly along the fixed rails in the Z-axis direction.

Over the main spindle 7, an NC loader 39 is provided. In more detail, a frame 14 is mounted on the main spindle 5. On the upper portion of this frame 14, a horizontal shaft 43 extending in the Z-axis direction is disposed. On this horizontal shaft 43, a loader body 45 is mounted so as to be movable in the Z-axis direction (in FIG. 2). Further, on this loader body 45, a vertical shaft 47 is provided so as to be movable in the Y-axis direction (vertical direction in FIG. 1). At the lower end of this vertical shaft 47, a load/unload hand 53 formed integral with a plurality of work and product hands (e.g., a work hand 49 and two product hands 51) is attached. Further, the horizontal shaft 43 and the vertical shaft 47 are both controlled numerically by servomotors (not shown), respectively.

On the other hand, a support frame 41 is mounted on the main spindle base 5. On the support frame 41, a workpiece shooter and product shooters 55 and 57 all formed into cassette type are mounted with bolts so as to be exchanged according to the sizes of workpieces and products. In FIG. 1, the workpieces shooter 55 is inclined right side down and the product shooter 57 is inclined left side down.

In the construction as described above, when a product is required to be unloaded from the chuck 9 and then workpiece is required to be loaded to the chuck 9, first the movable guard 37 is moved frontward (toward the right side in FIG. 2) to open the space over the main spindle 7. Then, in FIG. 2, the horizontal shaft 43 is moved frontward (rightward), so that the load/unload hand 53 is moved to the vertical position of the front surface of the chuck 9. Further, the vertical shaft 47 is moved downward, so that the product hand 51 is moved to the front surface of the chuck 9. Simultaneously when the chuck 9 is unclamped opened, a workpiece is moved (e.g., rolled down) to the product hand 51, so that the product hand 51 receives the workpiece. The vertical shaft 47 is further moved downward, so that the workpiece hand 49 moves to the front surface of the chuck 9.

The horizontal shaft 43 is moved rearward (leftward in FIG. 2), the workpiece gripped by the workpiece hand 49 is pushed into the chuck 49. After that, the chuck 9 is fastened closed. The horizontal shaft 43 is moved frontward (rightward), so that the workpiece hand 49 is kept away from the workpiece clamped by the chuck 9. The vertical shaft 47 is moved upward, so that the product unloading and workpiece loading can be completed. The horizontal shaft 43 is moved rearward (leftward in FIG. 2) to move the workpiece hand 49 and the product hand 51 both to the workpiece shooter 55 and the product shooter 57, respectively. The product is discharged from the product hand 51 into the product shooter 57. At the same time, a new workpiece is charged from the workpiece shooter 55 to the workpiece hand 49, respectively. The above-mentioned operation is repeated to cut a number of workpiece automatically by the NC lathe 1.

In the NC loader 39 for an NC lathe 1, since the operation shafts (horizontal and vertical shafts 43 and 47) can be both numerically controlled, it is possible to process the workpiece in accordance with a program stored in the NC unit. Further, since the workpiece and product hands 49 and 51 are both formed integral with each other and moved together by the same horizontal shaft 43 and vertical shaft 47 in two directions, it is possible to change or readjust the movements of the workpiece and product hands 49 and 51 by simply modifying the program. In addition, at the initial workpiece setup, it is possible simplify the setting-up operation (program) by changing only the coordinates of the workpiece and product hands 49 and 51 in accordance with the patterned program. Further, since the number of the shafts can be reduced from 3 to 2, the number of parts can be reduced and thereby the manufacturing cost of the NC loader 39 can be economized.

Further, since the workpiece and product shooters 55 and 57 are all formed into cassette type (not the adjustable types), it is possible to exchange the shooters without any adjustment work, thus simplifying the setting-up work or the replacement labor of the NC loader according to the sizes of the workpiece and product.

Figure 3:
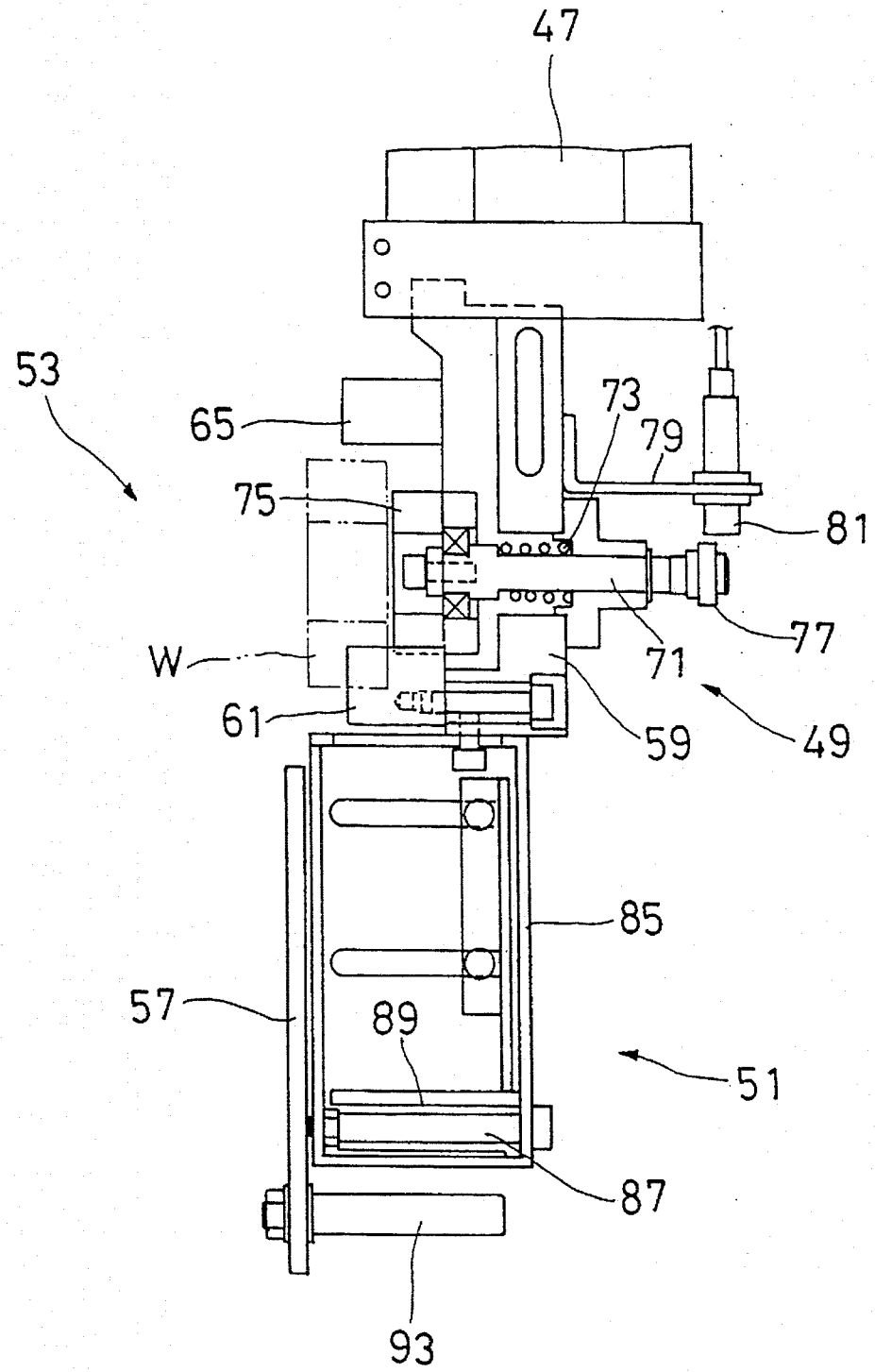
FIG. 3 is an enlarged front view showing the loading and unloading hand provided for the NC loader of the present invention.
Figure 4:
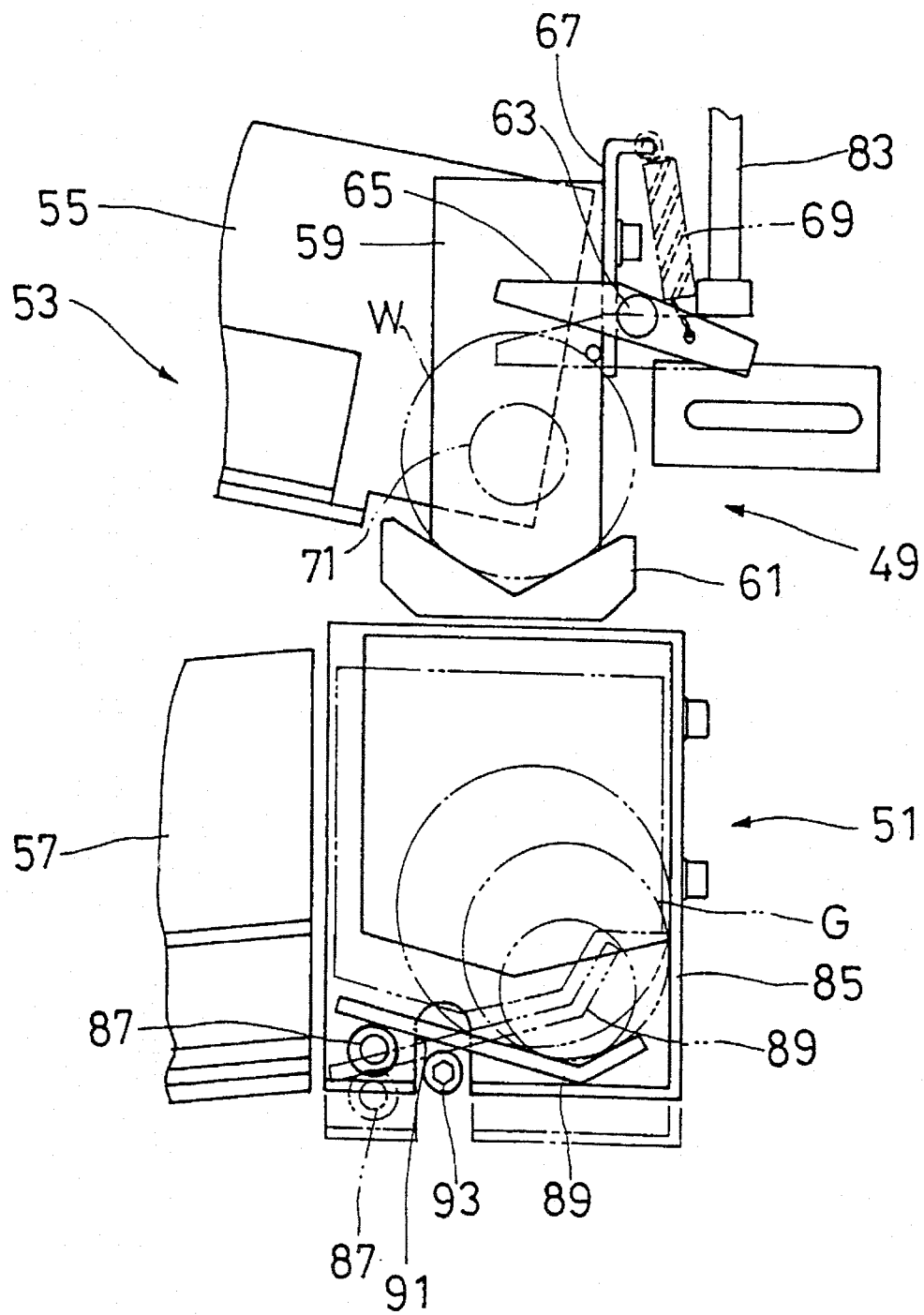
FIG. 4 is an enlarged side cross-sectional view showing the same loading and unloading hand shown in FIG. 3.

With reference to FIGS. 3 and 4, a practical example of the load/unload hand 53 saving as both the workpiece hand 49 and the product hand 51 will be described hereinbelow.

In these drawings, a body 59 of the workpiece hand 49 is attached to the lower end of the vertical shaft 47. On the lower portion of the body 59, a V-shaped lower clamp jaw 61 is fixed with bolts. Over the lower clamp jaw 61, an upper clamp jaw 65 pivotally movable around a pin 63 is supported by the body 59. A spring 69 is interposed between the right side (in FIG. 4) of the upper clamp jaw 65 and a support bracket 67 fixed to the body 59, so that the upper clamp jaw 65 is always urged clockwise by this spring 69 (workpiece clamp position).

Between the lower clamp jaw 61 and the upper clamp jaw 65 of the body 59, a horizontal axle 71 is attached so as to be always urged rightward by a spring 73, as shown in FIG. 3. This axle 71 is formed integral with a dog 77 on the right side thereof. On the left side of the horizontal axle 71 in FIG. 3, a stopper member 75 is mounted. Further, a proximity sensor 81 is mounted on a bracket 79 fixed to the body 59.

In the construction as described above, first a hydraulic cylinder (not shown) is actuated to move the piston rod 83 downward, that is, to move the left side of the upper clamp jaw 65 upward. Under these conditions, when the body 59 approaches the work shooter 55 and the work W is released from the workpiece shooter 55, since workpiece W is rolled down from the workpiece shooter 55, the workpiece hand 49 receives the workpiece W to be processed. At this time, since the workpiece W is brought into contact with the stopper member 75, the stopper member 75 is slid toward the right side (in FIG. 3) against an elastic force of the spring 73, so that the proximity sensor 81 detects the movement of the dog 77. When the movement of the dog 77 is sensed by the proximity sensor 81, it is possible to confirm that the workpiece W is mounted onto the lower clamp jaw 61. Under these conditions, when a cylinder (not shown) is actuated to move the piston rod 83 upward, since the left side of the upper clamp 65 is moved downward, the workpiece W can be clamped between the lower clamp jaw 61 and the upper clamp jaw 65. Where workpiece W is required to be unclamped, the above-mentioned operation is reversed.

Under the body 59, the product hand 51 of bucket shape 85 is disposed. Further, on the lower inside portion of the bucket 85, a bar 89 is pivotally supported around a pin 87. Further, the bucket 85b is formed with a U-shaped cutout portion 91 at the lower portion thereof, and a pin 93 fitted into this cutout 91 is disposed on the side of the shooter 57.

In the construction as described above, after the product G has been unloaded from the chuck 9 attached to the main spindle 7 onto the bar 89, when the bucket 85 is moved toward the product shooter 57 and then slightly downward, since the pin 93 is engaged with the cutout 91, the bar 89 is pivoted counterclockwise around the pin 87, so that it is possible to discharge the product G to the product shooter 57 automatically.

Further, in the above-mentioned embodiment, although the product hand 51 is of bucket type, it is also possible to adopt the product hand 51 of pin type. In this case, the product G is mounted on and clamped by the pins arranged at intervals according to the outer diameter of the product G.

As described above, in the NC loader 39 for an NC lathe 1 according to the present invention, since the workpiece loading position and the product unloading position are both set to the same axial position, it is possible to reduce the number of shafts and thereby to reduce the setup time and labor in the NC loader 39 for loading workpiece and unloading products automatically.

In addition, since the workpiece shooter and the product shooter are both of exchangeable cassette type, it is possible to further reduce the exchange time and labor of both the workpiece and product shooters according to the shapes of workpieces and products.

What is claimed is:

1. An NC loader for a machine tool having a main spindle mounted on a main spindle base, said NC loader comprising:

a support frame mounted on the main spindle base;

a loader body mounted on said support frame and provided with a horizontal shaft and a vertical shaft to allow said loading body to be movable in both horizontal and vertical directions, respectively;

a loading and unloading hand provided with a workpiece hand section and a product hand section both integrally attached to an end of the vertical shaft;

at least one workpiece shooter attached to said support frame, for loading work onto the workpiece hand section of said loading and unloading hand; and at least one product shooter attached to said support frame, for unloading products from the product hand section of said loading and unloading hand;

said workpiece hand section including a hand body attached to a lower end of the vertical shaft, a lower clamp jaw fixed to said hand body, for receiving a workpiece discharged from said workpiece shooter, a pivotal upper clamp jaw pivotally attached to said hand body, for clamping the discharged workpiece in cooperation with said lower clamp jaw, and a piston rod for pivoting said upper clamp jaw after the discharged workpiece has been mounted on said lower clamp jaw, and said product hand section including a bucket mounted at a lower end of said loading and unloading hand, and a pivotal bar disposed within said bucket for receiving a product.

2. The NC loader for an NC machine tool of claim 1, wherein in said loader body, the horizontal shaft is mounted on said support frame so as to extend in the horizontal direction; the loader body is slidably mounted on the horizontal shaft; and the vertical shaft is disposed in said loader body so as to be movable in the vertical direction.

3. The NC loader for an NC machine tool of claim 1, which further comprises a workpiece sensor having:

a horizontal axle disposed between said lower clamp jaw and said upper clamp jaw;

a stopper member attached to an end of said horizontal axle;

a spring for urging said horizontal axle;

a dog attached to the other end of said horizontal axle; and a proximity switch for sensing a movement of said dog attached to said horizontal axle, when the workpiece hand section receives the discharged workpiece so that said stopper member moves said horizontal axle against an elastic force of said spring, to actuate said upper clamp jaw for clamping the discharged workpiece in cooperation with the lower clamp jaw.

4. The NC loader of an NC machine tool of claim 1, wherein said product hand section of said loading and unloading hand further comprises pivotal means for pivoting said pivotal bar, including:

a cutout formed in a bottom portion of said bucket; and a pivotal pin engageable with the cutout formed in said bucket to discharge a product within said bucket to said product shooter, when said pivotal pin is engaged with the cutout.

5. The NC loader of an NC machine tool of claim 1, wherein said workpiece and product shooters are of cassette type exchanged according to sizes of the workpieces and products.

* * * * *